United States Patent
Dixon et al.

(10) Patent No.: US 8,194,973 B2
(45) Date of Patent: Jun. 5, 2012

(54) DECODING INFORMATION FROM A CAPTURED IMAGE

(75) Inventors: Brad N. Dixon, Corvallis, OR (US); Shawn J. Gibson, Albany, OR (US); Steven J. Simske, Fort Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 902 days.

(21) Appl. No.: 12/253,159

(22) Filed: Oct. 16, 2008

(65) Prior Publication Data

US 2009/0310874 A1 Dec. 17, 2009

Related U.S. Application Data

(60) Provisional application No. 61/061,226, filed on Jun. 13, 2008.

(51) Int. Cl.
*G06K 9/00* (2006.01)
*G06K 9/32* (2006.01)

(52) U.S. Cl. .................. 382/162; 382/167; 382/294

(58) Field of Classification Search .................. 382/162, 382/167, 294
See application file for complete search history.

(56) References Cited

U.S. PATENT DOCUMENTS

| | | | |
|---|---|---|---|
| 5,568,555 A | 10/1996 | Shamir | |
| 5,818,032 A | 10/1998 | Sun et al. | |
| 5,966,205 A | 10/1999 | Jung et al. | |
| 6,729,544 B2 | 5/2004 | Navon | |
| 6,866,199 B1 * | 3/2005 | Keech et al. | 235/490 |
| 7,032,823 B2 * | 4/2006 | Nojiri | 235/462.09 |
| 7,051,935 B2 * | 5/2006 | Sali et al. | 235/462.04 |
| 7,210,631 B2 | 5/2007 | Sali et al | |
| 7,240,839 B2 | 7/2007 | Jung et al. | |
| 8,006,911 B2 * | 8/2011 | Yi et al. | 235/494 |
| 8,096,480 B2 * | 1/2012 | Yi et al. | 235/494 |
| 2005/0274804 A1 | 12/2005 | Matsumoto | |
| 2006/0027660 A1 * | 2/2006 | Ming et al. | 235/462.04 |
| 2006/0027662 A1 | 2/2006 | Baradi | |
| 2006/0081711 A1 | 4/2006 | Zhao et al. | |
| 2006/0097062 A1 * | 5/2006 | Cheong et al. | 235/494 |
| 2006/0144947 A1 | 7/2006 | Sali et al. | |
| 2006/0157574 A1 * | 7/2006 | Farrar et al. | 235/494 |
| 2007/0199994 A1 | 8/2007 | Cattrone et al. | |

FOREIGN PATENT DOCUMENTS

| | | |
|---|---|---|
| EP | 1 591 948 A1 | 11/2005 |
| WO | WO 98/45799 | 10/1998 |
| WO | WO 2005/086076 A1 | 9/2005 |
| WO | WO 2006/089247 A2 | 8/2006 |
| WO | WO 2006/093376 A1 | 9/2006 |

* cited by examiner

*Primary Examiner* — Stephen R Koziol
*Assistant Examiner* — Utpal Shah

(57) ABSTRACT

A method for decoding information from a captured image is disclosed. The captured image has a plurality of color patches including a plurality of payload patches, a plurality of calibration patches, and an orientation patch. The orientation patch has a unique characteristic with respect to the payload patches and the calibration patches. The method includes identifying, within the captured image, the color patch having the unique characteristic as the orientation patch. The plurality of calibration patches are identified within the captured image. Each of the calibration patches has a unique predetermined location with respect to the identified orientation patch. A relative orientation of the image is determined based on a location of the identified orientation patch within the captured image. Calibration information is discerned according to characteristics of the identified calibration patches. The relative orientation and the calibration information are utilized to decode the information from the payload patches in the captured image.

20 Claims, 3 Drawing Sheets

DECODING INFORMATION FROM A CAPTURED IMAGE

CROSS REFERENCE TO RELATED APPLICATIONS

This Application claims the benefit of provisional patent application Ser. No. 61/061,226, filed Jun. 13, 2008 titled "DECODING INFORMATION FROM A CAPTURED IMAGE" which application is incorporated by reference herein as if reproduced in full below.

BACKGROUND

Useful information can be encoded in printed images often referred to as barcodes. For example, information identifying a product can be encoded in a barcode printed on packaging of a consumer good. The bar code can be scanned at a register to identify the product and a corresponding purchase price. Such bar codes are binary or two dimensional—black bars on a white field. A three dimensional image, such as a color tile, is capable of encoding much more information. A color tile is an image made up from a grid of color patches. Each color patch has a color (the third dimension) selected from a predetermined palette. Instead of being limited to the binary characteristics, a color tile has multi-bit characteristics where the number of bits is determined by the number of colors in the palette. While a color tile is capable of storing more complex information, it is also more complex to create and to decode.

DRAWINGS

DETAILED DESCRIPTION

Introduction

Various embodiments described below operate to decode information from a color tile assembled from a mosaic of color patches. The color tile includes payload patches used to encode the information and configuration patches used to orient the color tile and for color calibration. The configuration patches are made up of orientation patches and calibration patches. To decode the information, an image of the color tile is captured. The captured or digital image can be any one of many possible formats. Prior to decoding information from the payload patches, the orientation patches are identified to determine an orientation of the captured image, and the calibration patches are used for color calibration. Once the color tile has been oriented and colors calibrated, the payload patches can be properly identified and analyzed in a correct sequence to decode the information.

Color Tiles

Figure 1:
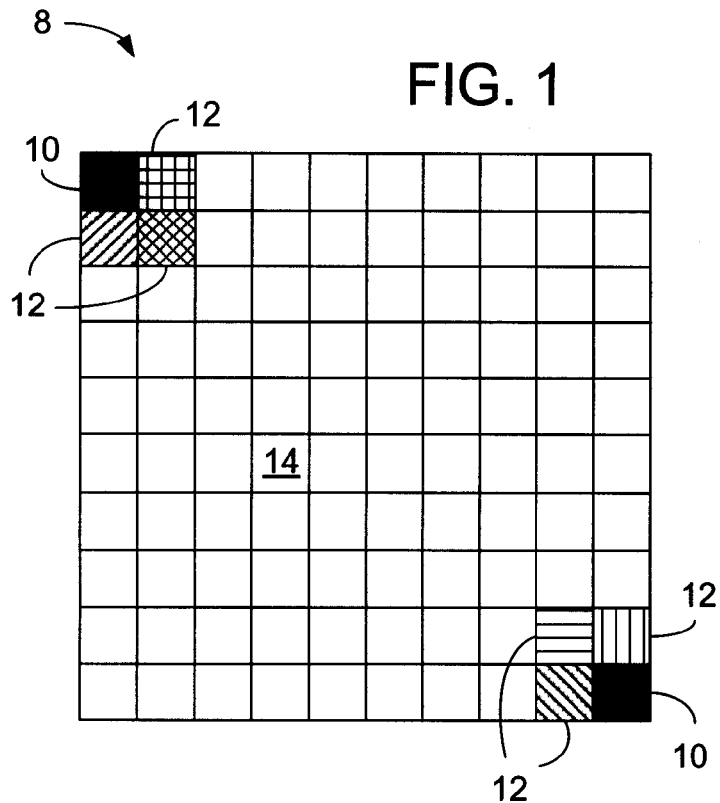
FIGS. 1 and 2 illustrate exemplary color tiles according embodiments.
Figure 2:
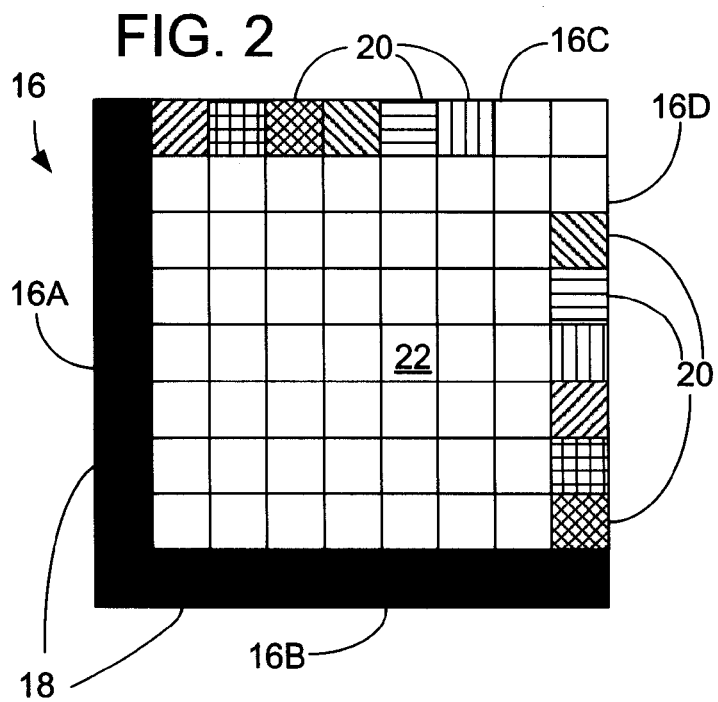

FIGS. 1 and 2 illustrate exemplary color tiles according to embodiments. Starting with FIG. 1, configuration patches of color tile 8 include orientation patches 10 and calibration patches 12. Color tile 8 is also shown to include payload patches 14. Each calibration patch 12 and payload patch 14 of color tile 8 has a color selected from the color palette shown in the legend of FIG. 1. That color palette includes "COLOR 1" through "COLOR 6". "COLOR 0" is reserved for orientation patches 10. In this manner orientation patches 10 each have a characteristic, a color in this example, that is unique with respect to calibration patches 12 and payload patches 14. While not shown as having any particular color, payload patches 14 will each have a color selected from the palette. The particular color chosen for each payload patch 14 depends upon the information to be encoded by that patch.

In the example of FIG. 1, orientation patches 10 are positioned at diagonally opposing corners and are each of the same color identified as "COLOR 0" in the legend of FIG. 1. Depending upon the intended configuration, one orientation patch 10 is positioned in either the upper left or upper right corner of color tile 8. In, FIG. 1, the upper left corner was chosen. The other orientation patch is positioned in the diagonally opposite corner. In FIG. 1, the bottom right corner has been chosen. Because color tile 8 is rectilinear, there are three patches adjacent to each corner containing an orientation patch 10 for a total of six such patches. These six patches make up calibration patches 12. Each of the six calibration patches 12 is a different one of the six palette colors.

Each calibration patch 12 has a predetermined location with respect to a given orientation patch 10. That predetermined position for a given calibration patch 12 depends upon the intended color of that calibration patch 12. In the example of a FIG. 1, it is predetermined that calibration patches 12 of colors one, two, and three are positioned adjacent to the upper-left orientation patch 10 in a predetermined manner—color one below, color three to the right, and color two below and to the right. In this example, it is also predetermined that orientation patches of colors four, five, and six are positioned adjacent to the lower right orientation patch 10 in a particular manner—color four to the left, color six above, and color five above and to the left. Note that the terms right, above, and below are relative terms. That is, they are used with respect to the intended alignment of color tile 8 in the example of FIG. 1.

When color tile 8 is scanned a digital or captured image is generated. Since orientation patches 10 share a unique characteristic, color in this case, that captured image can be analyzed to identify the corners containing orientation patches 10. With this information alone, the captured image of color tile 8 can then be relatively oriented at zero or one hundred eighty degrees of its intended alignment. In other words, the captured image is either right side up or upside down. In an example, it may be presumed that the upper-left corner of color tile 8 is occupied by an orientation patch 10 and three calibration patches 12 each of one of three predetermined colors from the palette. The diagonally opposing corner would then be occupied by three calibration patches of the remaining three colors from the palette. By identifying the orientation patch 10 that is adjacent to the three calibration patches 12 having the three predetermined colors, the upper-left corner of color tile 8 can be located to determine the relative orientation and properly align the captured image of color tile 8.

With the relative orientation known, payload patches 14 can be decoded in the proper sequence. However, the colors appearing in the captured image may deviate from the intended or expected colors of the palette. The deviation can, for example, be the result of printing or scanning quality issues. Color calibration adjusts for these deviations. Each calibration patch 12 is expected to be of an intended color selected from a palette. As explained above, the intended color of any given calibration patch is identifiable based on that calibration patch's position with respect to an orientation patch 10. For each calibration patch 12, a variation between the expected color and the color of that calibration patch measured or identified in the captured image of color tile 8. Using the variances for each color in the palette, payload patches 14 of each palette color can then be properly identified and decoded. For example, a given calibration patch 12 may be expected to be red. However, the actual color of that patch in the captured image of color tile 8 may be identified as pink. All payload patches 14 initially identified as being pink can then be properly recognized as being their expected color of red.

Moving to FIG. 2, color tile 16 is shown. In this example, the calibration patches of color tile 16 include orientation patches 18 and calibration patches 20. Color tile 16 is also shown to include payload patches 22. Each calibration patch 20 and payload patch 22 of color tile 16 has a color selected from the color palette shown in the legend of FIG. 2. That color palette includes "COLOR 1" through "COLOR 6". "COLOR 0" is reserved for orientation patches 18. In this manner orientation patches 18 each have a characteristic, a color in this example, that is unique with respect to calibration patches 20 and payload patches 22. While not shown as having any particular color, payload patches 22 will each have a color selected from the palette. The particular color chosen for each payload patch 22 depends upon the information to be encoded by that patch.

In the example of FIG. 2, orientation patches 18 are positioned along sides 16A and 16B of color tile 16, and each are each of the same color identified as "COLOR 0" in the legend of FIG. 2. Depending upon the intended configuration, sides 16A and 16B are either adjacent to or opposite from one another. In FIG. 2, sides 16A and 16B are adjacent. Calibration patches 20 occupy at least portions of sides 16C and 16D. Here, sides 16C and 16D are adjacent to one another. Sides 16C and 16D may instead be opposite one another.

As with FIG. 1, each calibration patch 20 in FIG. 2 has a predetermined location with respect to a given orientation patch 18. That predetermined position for a given calibration patch 20 depends upon the intended color of that calibration patch 20. In the example of a FIG. 2, a calibration patch 20 of each palette color occupies a predetermined position along side 16C. Likewise, a calibration patch 20 of each palette color occupies a predetermined position along side 16D. In the example of FIG. 2, the orders in which the colors appear along sides 16D and 16C differ. However, the orders could be identical.

When color tile 16 is scanned a digital or captured image is generated. Since orientation patches 18 share a unique characteristic, color in this case, that captured image can be analyzed to identify sides 16A and 16B. With this information, the relative orientation of the captured image of color tile 16 can identified. In an example, it may be presumed that the left and bottom sides 16A and 16B of color tile 16 are occupied by orientation patches 18. Identifying orientation patches 18 then serves to locate these sides in the captured image and thus the relative orientation.

With the relative orientation known, payload patches 22 can be decoded in the proper sequence. However, the colors appearing in the captured image may deviate from the intended colors of the palette. The deviation can, for example, be the result of printing or scanning quality issues. Color calibration functions to correct these deviations. Each calibration patch 20 is expected to be of an intended color selected from a palette. As explained above, the intended color of any given calibration patch is identifiable based on that calibration patch's position with respect to an orientation patch 18. For each calibration patch 20, a variation between the expected color and the color of that calibration patch measured or identified in the captured image of color tile 16. In the example of FIG. 2, two variance values for each color in the palette can be identified and averaged for improved accuracy. Using the average variances for each color in the palette, payload patches 22 of each palette color can then be properly identified and decoded.

Components

Figure 3:
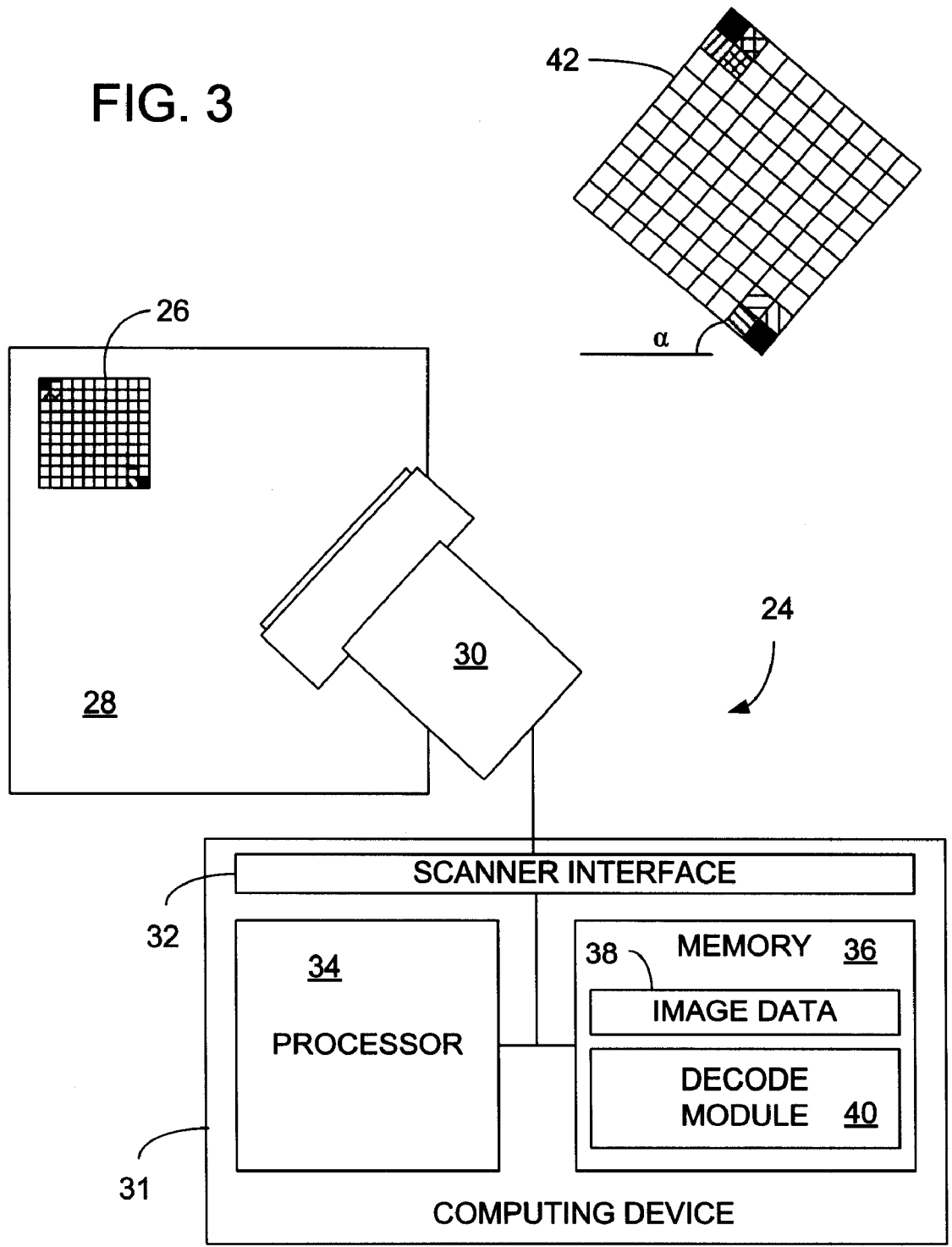
FIG. 3 is a block diagram illustrating an exemplary environment in which embodiments may be implemented.

FIG. 3 illustrates various physical and logical components of a system 24 configured to implement an embodiment. FIG. 3 also show a color tile 26 formed on a medium 28. That medium 28, for example may be a sheet of paper, a label, a computer or television display screen, or any other material on which a color tile image 26 can be formed and observed. Color tile 26 may, for example, be a color tile as shown in FIG. 1 or FIG. 2.

System 24 is shown to include scanner 30 and computing device 31. Scanner 30 may be integrated into computing device 31 or a separate component. Scanner 30 represents generally any device capable of capturing an image of a physical object. The captured image is a digital representation of the physical object and can be one of any number of possible formats. Here the intent is for scanner 30 to capture an image of color tile 26. Computing device 31 represents generally any device that can analyze information from a captured image of color tile 26. In one example, computing device 31 may be a portable device such as a cellular telephone or the like and scanner 30 may be a digital camera embedded in that portable device. In another example, scanner 30 may be a separate device that can communicate with computing device 31 via a wired or wireless link. Such communication may also be accomplished via a memory device such as a CD Rom or flash memory card.

In the example of FIG. 3, computing device 31 includes scanner interface 32, processor 34, and memory 36. Scanner interface 32 represents generally any combination of hardware and/or programming configured to allow computing device 31 to receive a captured image from scanner 30. Scanner interface 32, for example, may be a wired or wireless communications port. Scanner interface 32 may instead be a CD Rom drive or a memory card reader. Processor 34 represents generally any device capable of utilizing scanner interface to obtain a captured image of a color tile. Processor 34 is also responsible for executing program instruction stored in memory 36. Memory 36 represents generally any memory configured to store an image of a color tile captured by scanner 30 and to store program instructions that, when executed, cause processor 34 to analyze and decode information from the captured image.

Memory 36 is shown to include image data 38 and decode module 40. Image data 38 represents generally a captured image of a color tile obtained from scanner 30 via scanner interface 32. Decode module 40 represents generally any programming for analyzing and decoding information from a captured image of a color tile. FIG. 3 also illustrates a representation of a captured image 42 of a color tile such as color tile 8 of FIG. 1. In this example, image 42, as captured, is rotated by an angle α with respect to its intended relative orientation. Prior to decoding its payload patches, the relative orientation of captured image 42 is determined so that the payload patches can be identified and decoded in the proper sequence. As described above, it can also prove beneficial to perform a color calibration to avoid decoding errors that might otherwise occur. As discussed below with respect to FIG. 4, the decode module 40 includes programming for orienting and color calibration.

Figure 4:
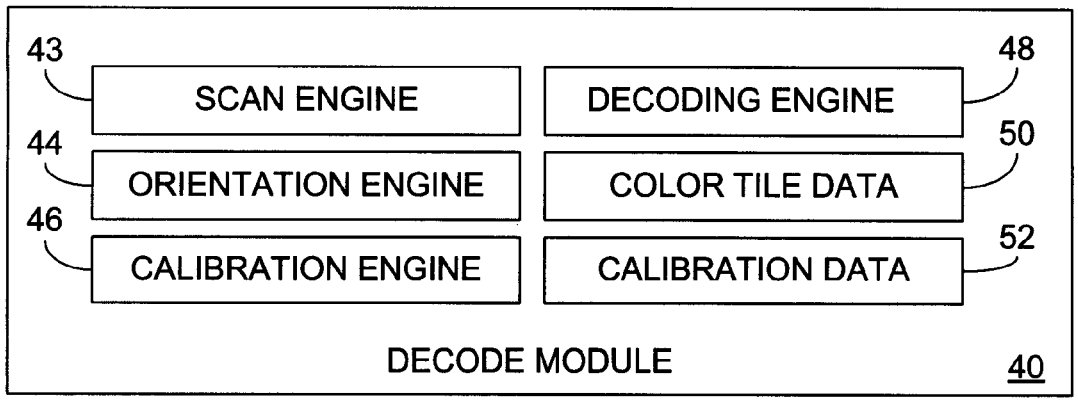
FIG. 4 is a block diagram of an exemplary decode module according to an embodiment.

Referring to FIG. 4, decode module 40 includes scan engine 43, orientation engine 44, calibration engine 46, decoding engine 48, color tile date 50, and calibration data 52. Scan engine 43 represents generally any programming for utilizing scanner 30 to capture an image of a color tile. It is noted that in some implementations scan engine 43 may be embedded in scanner 30 rather than being stored in memory 36 of computing device 31.

Orientation engine 44 represents programming for determining a relative orientation of a captured image of a color tile so that the payload patches can be analyzed and decoded in the proper sequence. Referring back to FIGS. 1 and 2, orientation engine is responsible for identifying orientation patches in the captured image. To do so, orientation engine 44 is provided with data identifying the unique characteristic that distinguishes the orientation patches from the other patches of the color tile. This characteristic could, for example, be a black color. Orientation engine 44 identifies, within the captured image, each color patch having the unique characteristic as an orientation patch. Orientation engine 44 then determines a relative orientation of the captured image based on the locations of the orientation patches within the captured image.

In the example of FIG. 2, the orientation patches identify the left and bottom sides of a color tile and no further analysis is required to determine the orientation. However, in FIG. 1 the orientation patches identify the upper left and lower right corners. By simply identifying the orientation patches in FIG. 1, orientation module 44 cannot yet discern if the captured image is right side up or upside down. As noted above, a first subset of calibration patches is positioned adjacent to one orientation patch, and a second subset of calibration patches is positioned adjacent to the other orientation patch. The calibration patches include all colors from the color tile's color palette. The color palette can be divided into two subsets of colors so that the first subset of calibration patches are of colors from a first subset of palette colors, and the second subset of calibration patches are of colors from a second subset of palette colors.

Orientation module 44 is informed to expect that the orientation patch that is positioned adjacent to a particular subset of calibration patches occupies a particular corner of the color tile. That particular subset of calibration patches is the subset that has colors from a predetermined subset of palette colors. After identifying the first and second subsets of calibration patches, orientation engine 44 analyzes the captured image to identify which subset has colors that more closely match the expected predetermined subset of palette colors. For example, the following equation could be used.

$$\sqrt{(C1e-C1m)^2+(C2e-C2m)^2+(C3e-C3m)^2}$$

C1e, C2e, and C3e represent each of the predetermined subset of palette colors. C1m, C2m, and C3m represent the identified colors of a given subset of calibration patches in the captured image. The value would be calculated for each subset, and the subset with the lowest result would be selected.

Orientation module 44 can then determine the relative orientation of the captured image. For example, orientation module may be informed to expect that the orientation patch positioned adjacent to a red, green, and blue calibration patches identifies the upper left hand corner of the captured image. The other orientation patch could then be positioned adjacent to calibration patches that are expected to be cyan, magenta, and yellow. Orientation module 44 then identifies the subset of calibration patches that more closely matches the expected red, green, and blue colors.

Still referring to FIG. 4, calibration engine 46 represents programming for discerning calibration information according to characteristics of calibration patches identified in a captured image of a color tile. More particularly, calibration engine 46 is configured to perform a color calibration based on a comparison of expected colors of a color tile with the actual colors identified in a capture image of the color tile. For example, calibration engine 46 is provided with information needed to identify the calibration patches within the captured image and the expected color of each. As described above with reference to FIGS. 1 and 2, the expected color of each calibration patch is determinable based on the position of that calibration patch with respect to an orientation patch. In FIG. 1, the calibration patches are positioned adjacent to orientation patches in diagonally opposing corners. In FIG. 2, the calibration patches occupy sides of the color tile that are not occupied by a line of orientation patches.

For each calibration patch in the captured image, calibration engine 46 measures a variance between the expected color for that calibration patch and the color of that patch identified in the captured image. For example, a given calibration patch may be expected to be red. Because of printing defects or errors in capturing the image of the color tile, the actual color of the patch may be identified as pink. The measured variance would then be indicative of the difference between red and pink. Payload patches sharing the same variance from red could be identified as being red.

Decoding engine 48 represents programming for analyzing a captured image of a color tile, identifying payload patches in the captured image, and decoding information from those payload patches. In particular, decoding engine 48 utilizes the relative orientation determined by orientation engine 44 to identify the payload patches and to discern the proper sequence in which to decode the patches. Decoding engine 48 utilizes information discerned from the color calibration performed by calibration engine 46 to properly discern the color of each payload patch.

Color tile data 50 represents data defining expected characteristics of a color tile such as color tile 8 of FIG. 1 or color tile 16 of FIG. 2. Such data is used by orientation engine 44, calibration engine 46, and decoding engine 48 to identify an expected color palette and expected locations of orientation, calibration, and payload patches. Calibration data 52 represents data indicative of the measured variances between expected colors and identified colors of a capture image as measured by calibration engine 46. Decoding module 48 utilizes calibration data 52 to properly discern the color of each payload patch.

Operation

Figure 5:
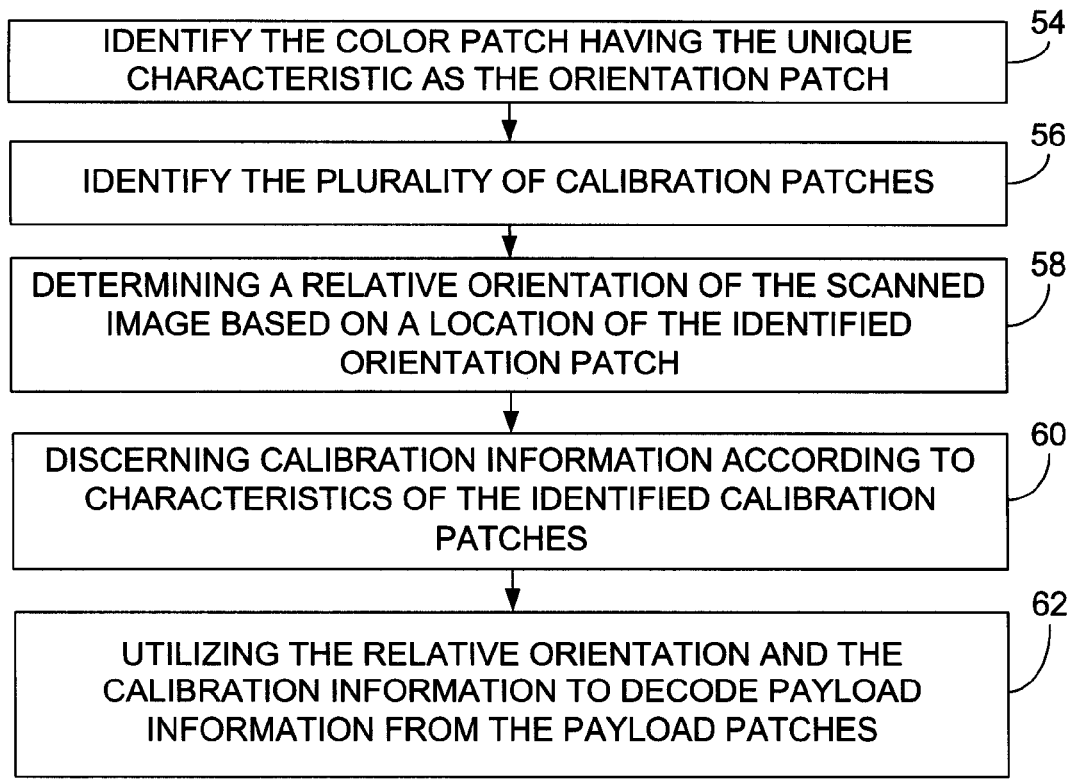
FIG. 5 is an exemplary flow diagram illustrating steps taken to implement an embodiment.

FIG. 5 is an exemplary flow diagram of steps taken to implement an embodiment. Initially, an image of a color tile is captured. Examining the captured image, a color patch having a predetermined unique characteristic is identified as an orientation patch (step 54). The unique characteristic, for example, may be a color such as black. Continuing to analyze the captured image, a plurality of calibration patches are identified (step 56). The calibration patches are identified based on their location with respect to the identified orientation patch in the captured image.

The relative orientation of the captured image is determined based upon the location of the identified orientation patch (step 58). For example, the location of the orientation patch may identify a particular corner or side of the captured image. Calibration information is discerned according to characteristics of the identified calibration patches (step 60). Based upon its location with respect to the orientation patch, each calibration patch has an expected color. The calibration information can include measured variances between the expected color of a calibration patch and the identified color of the patch in the captured image.

Payload information is then decoded from the payload patches of the captured image (step 62). Step 62 is accomplished using the relative orientation determined in step 58 and the calibration information discerned in step 60. For example, using the relative orientation, the payload patches can be decoded in a proper sequence. Using the calibration information, the intended color of each payload patch can be accurately identified.

In a given implementation, each one of the calibration patches identified in step 56 is expected to be a predetermined different one of a palette of colors. The particular color expected for a given calibration patch may be dependent upon the location of that calibration patch with respect to the position of the identified orientation patch. Discerning calibration information in step 60 can include measuring, for each calibration patch, a variance between the expected color for that patch and the color of that patch identified in the captured image. Utilizing in step 62 then includes utilizing the measured variances to decode the information from the payload patches.

In another implementation, the orientation patch identified in step 54 is one of a first and a second orientation patch that each share the unique characteristic. Each one of the calibration patches identified in step 56 is expected to be a predetermined different one of a palette of colors. Each of a first subset of the calibration patches is positioned adjacent to the first orientation patch. Each of a second subset of the calibration patches is positioned adjacent to the second orientation patch. Step 54 then includes identifying the two patches having the unique characteristic as the first and second orientation patches. Determining the relative orientation in step 58 includes identifying which of the first or second subset of calibration patches identified in the captured image that has colors that more closely matches an expected predetermined subset of the palette of colors. The relative orientation of the captured image is then determined based on a location of the first or second orientation patch that is adjacent to the identified subset of calibration patches.

Continuing, the color tile may be rectilinear in shape. In which case, the first orientation patch can be located in one corner and the second orientation patch can be located in a diagonally opposing corner. In such an implementation, there are three color patches adjacent to each orientation patch. The first subset of calibration patches would then include the three patches adjacent to the first orientation patch and the second subset of calibration patches would include the three patches adjacent to the second orientation patch.

In another implementation, the orientation patch identified in step 54 is one of a plurality of orientation patches that share the unique characteristic. A first subset of the plurality of orientation patches occupies an edge or side of the captured image. A second subset of the orientation patches occupies a second edge or side of the captured image. Step 54 then involves identifying the plurality of orientation patches having the unique characteristic. Step 58 then includes determining the relative orientation based on a location, in the captured image, of the first and second edges occupied by the plurality of orientation patches.

Continuing, a first subset of the calibration patches may occupy a third edge or side of the captured image, and a second subset of the calibration patches may occupy the fourth side or edge. Based on its position along the third edge, each of the first subset of calibration patches is expected to be a predetermined one of the palette of colors. Likewise, based on its position along the fourth edge, each of the second subset of calibration patches is expected to be a predetermined one of the palette of colors. Step 60 then includes measuring, for each calibration patch, a variance between the expected color of that patch and the actual color identified in the captured image. Utilizing in step 62 then includes utilizing the measured variance for each calibration patch to decode the payload patches.

Conclusion

The color tiles 8 and 16 of FIGS. 1 and 2 are exemplary color tiles for use in implementing various embodiments. Color tiles of other configurations are contemplated. The common factor among possible color tile configurations is the inclusion of orientation patches, calibration patches and payload patches. The orientation patches have unique characteristics not shared by the calibration and payload patches. The calibration patches have predetermined locations with respect to the orientation patches. Based on its give location, each calibration patch has an expected color.

The diagrams of FIGS. 3 and 4 show the architecture, functionality, and operation of various embodiments. Various components illustrated in FIGS. 3 and 4 are defined at least in part as programs. Each such component, portion thereof, or various combinations thereof may represent in whole or in part a module, segment, or portion of code that comprises one or more executable instructions to implement any specified logical function(s). Each component or various combinations thereof may represent a circuit or a number of interconnected circuits to implement the specified logical function(s).

Also, the present invention can be embodied in any computer-readable media for use by or in connection with an instruction execution system such as a computer/processor based system or an ASIC (Application Specific Integrated Circuit) or other system that can fetch or obtain the logic from computer-readable media and execute the instructions contained therein. "Computer-readable media" can be any media that can contain, store, or maintain programs and data for use by or in connection with the instruction execution system. Computer readable media can comprise any one of many physical media such as, for example, electronic, magnetic, optical, electromagnetic, or semiconductor media. More specific examples of suitable computer-readable media include, but are not limited to, a portable magnetic computer diskette such as floppy diskettes or hard drives, a random access memory (RAM), a read-only memory (ROM), an erasable programmable read-only memory, or a portable compact disc.

Although the flow diagram of FIG. 5 shows a specific order of execution, the order of execution may differ from that which is depicted. For example, the order of execution of two or more blocks may be scrambled relative to the order shown. Also, two or more blocks shown in succession may be executed concurrently or with partial concurrence. All such variations are within the scope of the present invention.

The present invention has been shown and described with reference to the foregoing exemplary embodiments. It is to be understood, however, that other forms, details and embodiments may be made without departing from the spirit and scope of the invention that is defined in the following claims.

What is claimed is:

1. A method for decoding information from a captured image having a plurality of color patches including a plurality of payload patches, a plurality of calibration patches, and an orientation patch having a unique characteristic with respect to the payload patches and the calibration patches, the method comprising:

identifying, within the captured image, the color patch having the unique characteristic as the orientation patch;

identifying, within the captured image, the plurality of calibration patches, each of the calibration patches having a unique predetermined location with respect to the identified orientation patch;

determining a relative orientation of the image based on a location of the identified orientation patch within the captured image;

discerning calibration information according to characteristics of the identified calibration patches;

utilizing the relative orientation and the calibration information to decode the information from the payload patches in the captured image.

2. The method of claim 1, wherein:

each of the calibration patches is expected to be a predetermined different one of a palette of colors;

discerning calibration information includes measuring, for each calibration patch, a variance between the expected color of that calibration patch and a color of that calibration patch identified in the captured image; and utilizing comprises utilizing the relative orientation and the measured variance for each of the calibration patches to decode the payload patches in the captured image.

3. The method of claim 2, wherein:

each of the calibration patches is expected, based on its location with respect to the orientation patch, to be a predetermined different one of the palette of colors; and measuring comprises, for each of the calibration patches, identifying the expected color for that calibration patch based on a location of that patch with respect to the orientation patch and measuring a variance between that expected color and the color of that calibration patch identified in the captured image.

4. The method of claim 1, wherein:

the orientation patch is one of a first orientation patch and a second orientation patch each having the unique characteristic;

each of the calibration patches is expected to be a different predetermined one of a palette of colors;

each of a first subset of the calibration patches is positioned adjacent to the first orientation patch and each of a second subset of the calibration patches is positioned adjacent to the second orientation patch;

identifying the color patch having the unique characteristic comprises identifying, within the captured image, the two color patches having the unique characteristic as the first and second orientation patches;

determining a relative orientation comprises identifying which of the first or second subset of calibration patches has colors identified in the captured image that more closely match an expected predetermined subset of the palette of colors and determining a relative orientation of the image based on a location of the first or second orientation patch that is adjacent to the identified first or second subset of calibration patches.

5. The method of claim 4, wherein:

the image is rectilinear in shape;

the first orientation patch is positioned in a first corner of the image and the second orientation patch is located in a second corner of the image, the second corner being diagonally opposite the first corner, so there are three color patches adjacent to the first orientation patch and three color patches adjacent to the second orientation patch;

the first subset of calibration patches include the three patches adjacent to the first orientation patch and the second subset of calibration patches include the three color patches adjacent to the second orientation patch; and each of the first subset of calibration patches being one of the predetermined subset of the palette of colors.

6. The method of claim 1, wherein:

the image is rectilinear in shape;

the orientation patch is one of a plurality of orientation patches each having the characteristic, a first subset of the orientation patches occupies a first edge of the image and a second subset of the orientation patches occupies a second edge of the image, the first edge being adjacent to the second edge;

identifying the color patch having the unique characteristic comprises identifying, within the captured image, the plurality of color patches having the characteristic as the plurality of orientation patches;

determining a relative orientation comprises determining a relative orientation of the image based on a location, within the captured image, of the first and second edges occupied by the plurality of orientation patches.

7. The method of claim 6, wherein:

a first subset of the calibration patches occupies a third edge of the image and a second subset of the calibration patches occupies a fourth edge of the image;

each of the first subset of calibration patches is expected, based upon its position along the third edge to be a predetermined different one of a palette of colors;

each of the second subset of calibration patches is expected, based upon its position along the fourth edge to be a predetermined different one of the palette of colors;

discerning calibration information includes measuring, for each calibration patch, a variance between the expected color of that calibration patch and a color of that calibration patch identified in the captured image; and utilizing comprises utilizing the relative orientation and the measured variance for each of the calibration patches to decode the payload patches in the captured image.

8. A non-transitory computer readable medium having computer executable instructions that when executed operate to decode information from a captured image having a plurality of color patches including a plurality of payload patches, a plurality of calibration patches, and an orientation patch having a unique characteristic with respect to the payload patches and the calibration patches, the medium including instructions for:

identifying, within the captured image, the color patch having the unique characteristic as the orientation patch;

identifying, within the captured image, the plurality of calibration patches, each of the calibration patches having a unique predetermined location with respect to the identified orientation patch;

determining a relative orientation of the image based on a location of the identified orientation patch within the captured image;

discerning calibration information according to characteristics of the identified calibration patches;

utilizing the relative orientation and the calibration information to decode the information from the payload patches in the captured image.

9. The non-transitory medium of claim 8, wherein:
each of the calibration patches is expected to be a predetermined different one of a palette of colors;
the instructions for discerning calibration information includes instructions for measuring, for each calibration patch, a variance between the expected color of that calibration patch and a color of that calibration patch identified in the captured image; and
the instructions for utilizing includes instructions for utilizing the relative orientation and the measured variance for each of the calibration patches to decode the payload patches in the captured image.

10. The non-transitory medium of claim 9, wherein:
each of the calibration patches is expected, based on its location with respect to the orientation patch, to be a predetermined different one of the palette of colors; and
the instructions for measuring include instructions for, for each of the calibration patches, identifying the expected color for that calibration patch based on a location of that patch with respect to the orientation patch and measuring a variance between that expected color and the color of that calibration patch identified in the captured image.

11. The non-transitory medium of claim 8, wherein:
the orientation patch is one of a first orientation patch and a second orientation patch each having the unique characteristic;
each of the calibration patches is expected to be a different predetermined one of a palette of colors;
each of a first subset of the calibration patches is positioned adjacent to the first orientation patch and each of a second subset of the calibration patches is positioned adjacent to the second orientation patch;
the instructions for identifying the color patch having the unique characteristic include instructions for identifying, within the captured image, the two color patches having the unique characteristic as the first and second orientation patches;
the instructions for determining a relative orientation include instructions for identifying which of the first or second subset of calibration patches has colors identified in the captured image that more closely match an expected predetermined subset of the palette of colors and determining a relative orientation of the image based on a location of the first or second orientation patch that is adjacent to the identified first or second subset of calibration patches.

12. The non-transitory medium of claim 11, wherein:
the image is rectilinear in shape;
the first orientation patch is positioned in a first corner of the image and the second orientation patch is located in a second corner of the image, the second corner being diagonally opposite the first corner, so there are three color patches adjacent to the first orientation patch and three color patches adjacent to the second orientation patch;
the first subset of calibration patches include the three patches adjacent to the first orientation patch and the second subset of calibration patches include the three color patches adjacent to the second orientation patch; and
each of the first subset of calibration patches being one of the predetermined subset of the palette of colors.

13. The non-transitory medium of claim 8, wherein:
the image is rectilinear in shape;
the orientation patch is one of a plurality of orientation patches each having the characteristic, a first subset of the orientation patches occupies a first edge of the image and a second subset of the orientation patches occupies a second edge of the image, the first edge being adjacent to the second edge;
the instructions for identifying the color patch having the unique characteristic includes instructions for identifying, within the captured image, the plurality of color patches having the characteristic as the plurality of orientation patches;
the instructions for determining a relative orientation include instructions for determining a relative orientation of the image based on a location, within the captured image, of the first and second edges occupied by the plurality of orientation patches.

14. The non-transitory medium of claim 13, wherein:
a first subset of the calibration patches occupies a third edge of the image and a second subset of the calibration patches occupies a fourth edge of the image;
each of the first subset of calibration patches is expected, based upon its position along the third edge to be a predetermined different one of a palette of colors;
each of the second subset of calibration patches is expected, based upon its position along the fourth edge to be a predetermined different one of the palette of colors;
the instructions for discerning calibration information include instructions for measuring, for each calibration patch, a variance between the expected color of that calibration patch and a color of that calibration patch identified in the captured image; and
the instructions for utilizing include instructions for utilizing the relative orientation and the measured variance for each of the calibration patches to decode the payload patches in the captured image.

15. A system for decoding information from a captured image having a plurality of color patches including a plurality of payload patches, a plurality of calibration patches, and an orientation patch having a unique characteristic with respect to the payload patches and the calibration patches, the system comprising:
an orientation engine configured to identify, within the captured image, the color patch having the unique characteristic as the orientation patch and to determine a relative orientation of the image based on a location of the identified orientation patch within the captured image;
a calibration engine configured to identifying, within the captured image, the plurality of calibration patches, each of the calibration patches having a unique predetermined location with respect to the identified orientation patch, the calibration engine being configured to discern calibration information according to characteristics of the identified calibration patches;
a decoding engine configured to utilize the relative orientation and the calibration information to decode the information from the payload patches in the captured image.

16. The system of claim 15, wherein:
each of the calibration patches is expected to be a predetermined different one of a palette of colors;
the calibration engine is operable to discern calibration information by measuring, for each calibration patch, a variance between the expected color of that calibration patch and a color of that calibration patch identified in the captured image; and the decoding engine is operable to utilize the relative orientation and the measured variance for each of the calibration patches to decode the payload patches in the captured image.

17. The system of claim 16, wherein:

each of the calibration patches is expected, based on its location with respect to the orientation patch, to be a predetermined different one of the palette of colors; and the calibration engine is operable to identify, for each of the calibration patches, the expected color for that calibration patch based on a location of that patch with respect to the orientation patch and measuring a variance between that expected color and the color of that calibration patch identified in the captured image.

18. The system of claim 15, wherein:

the orientation patch is one of a first orientation patch and a second orientation patch each having the unique characteristic;

each of the calibration patches is expected to be a different predetermined one of a palette of colors;

each of a first subset of the calibration patches is positioned adjacent to the first orientation patch and each of a second subset of the calibration patches is positioned adjacent to the second orientation patch;

the orientation engine is operable to identify, within the captured image, the two color patches having the unique characteristic as the first and second orientation patches to identify which of the first or second subset of calibration patches has colors identified in the captured image that more closely match an expected predetermined subset of the palette of colors and determining a relative orientation of the image based on a location of the first or second orientation patch that is adjacent to the identified first or second subset of calibration patches.

19. The system of claim 15, wherein:

the image is rectilinear in shape;

the orientation patch is one of a plurality of orientation patches each having the characteristic, a first subset of the orientation patches occupies a first edge of the image and a second subset of the orientation patches occupies a second edge of the image, the first edge being adjacent to the second edge;

the orientation image is operable to identify, within the captured image, the plurality of color patches having the characteristic as the plurality of orientation patches and to determine a relative orientation of the image based on a location, within the captured image, of the first and second edges occupied by the plurality of orientation patches.

20. The system of claim 19, wherein:

a first subset of the calibration patches occupies a third edge of the image and a second subset of the calibration patches occupies a fourth edge of the image;

each of the first subset of calibration patches is expected, based upon its position along the third edge to be a predetermined different one of a palette of colors;

each of the second subset of calibration patches is expected, based upon its position along the fourth edge to be a predetermined different one of the palette of colors;

the calibration engine is operable to discern calibration information by measuring, for each calibration patch, a variance between the expected color of that calibration patch and a color of that calibration patch identified in the captured image; and the decoding engine is operable to utilize the relative orientation and the measured variance for each of the calibration patches to decode the payload patches.

* * * * *